June 17, 1947.  H. B. WRIGHT  2,422,512
OIL GAUGE WIPER
Filed April 14, 1945   3 Sheets-Sheet 1
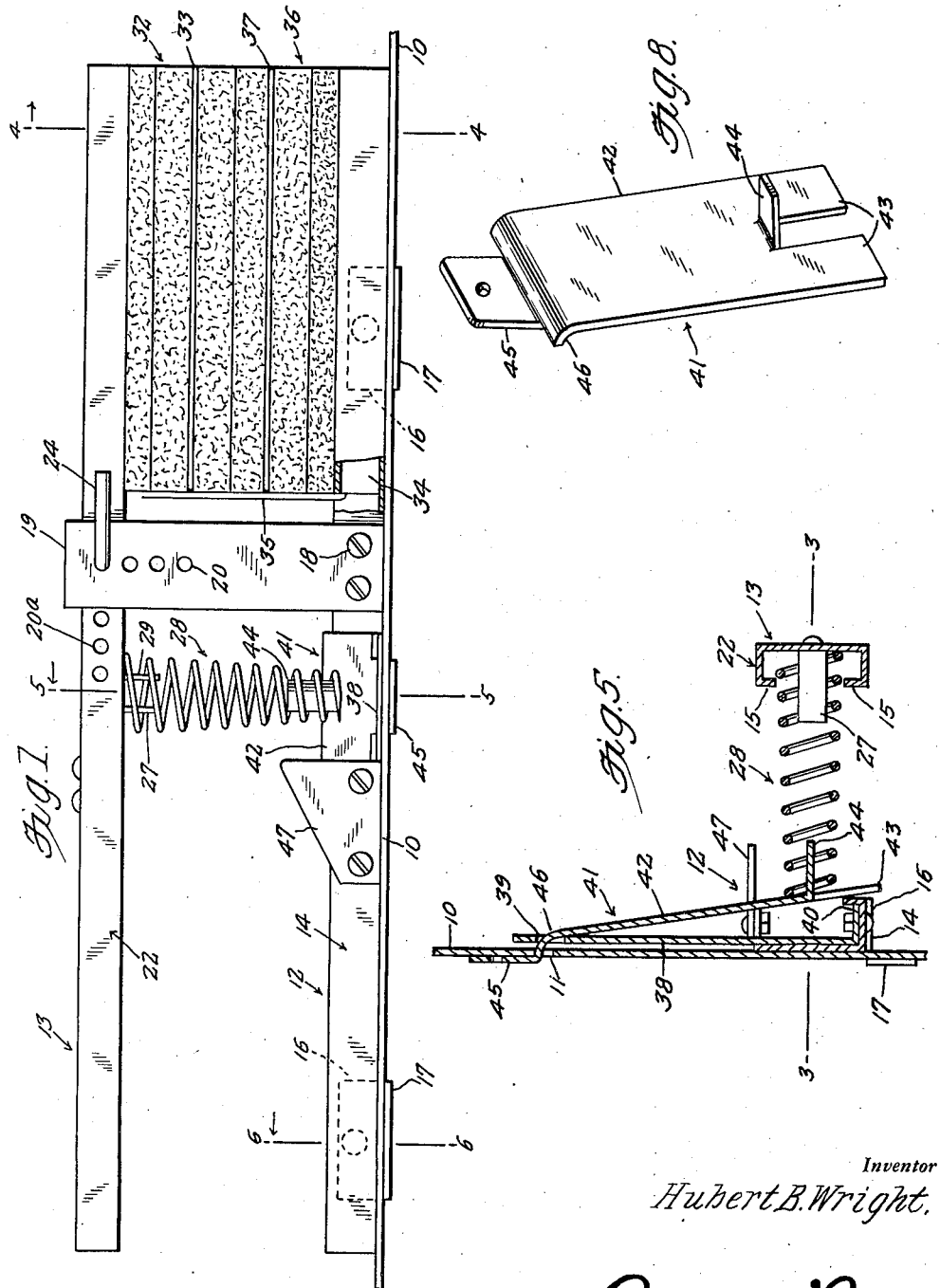
Inventor
*Hubert B. Wright*,
By *Clarence A. O'Brien
and Harvey B. Jacobson*
Attorneys

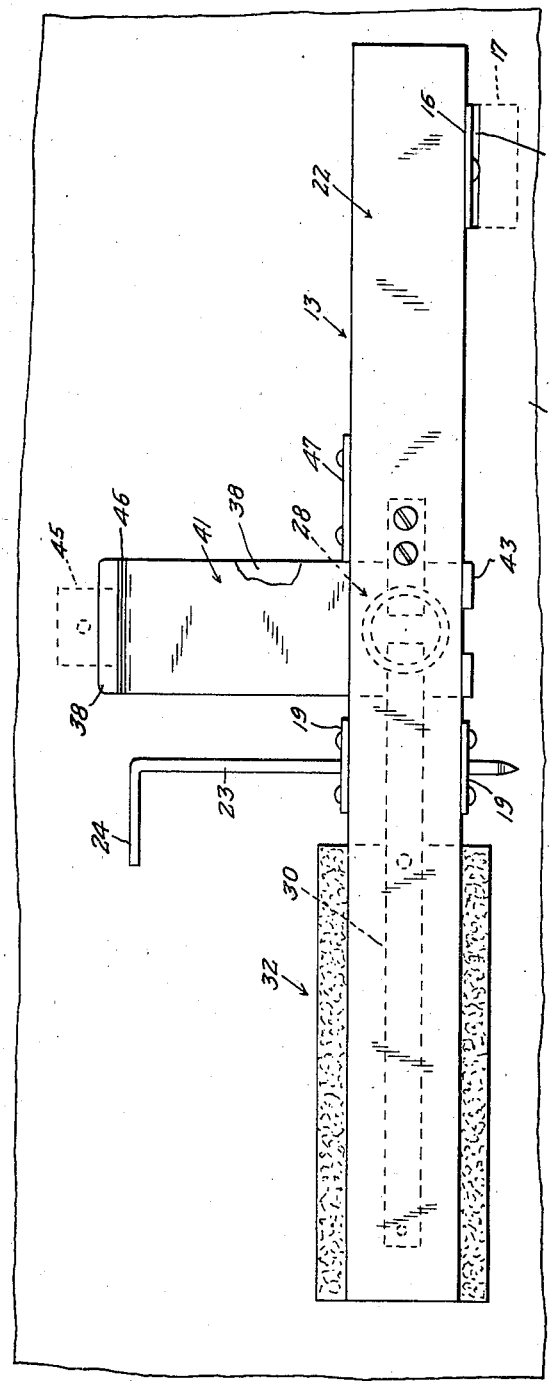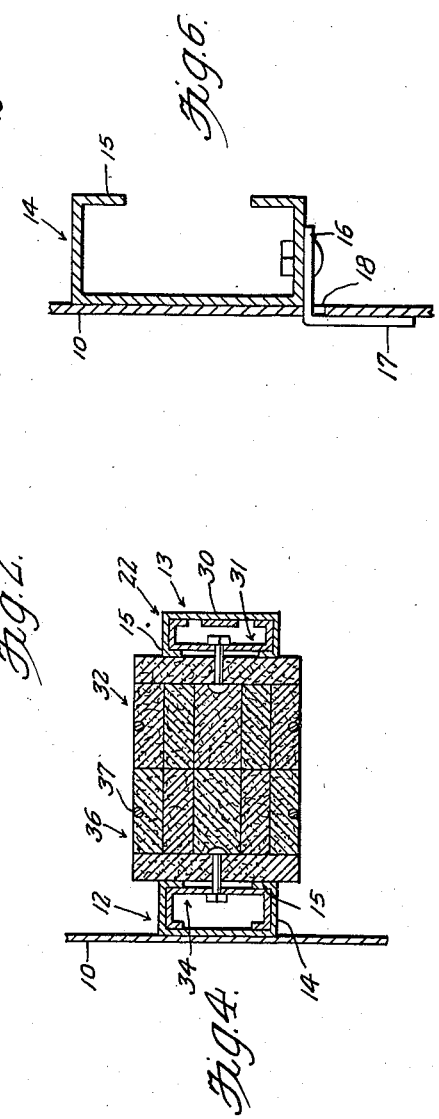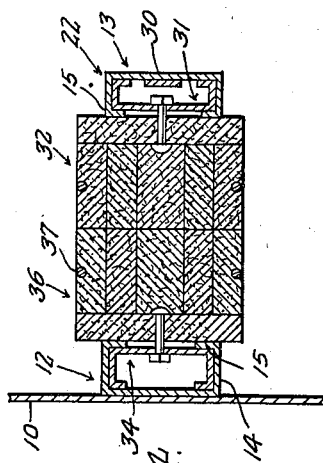

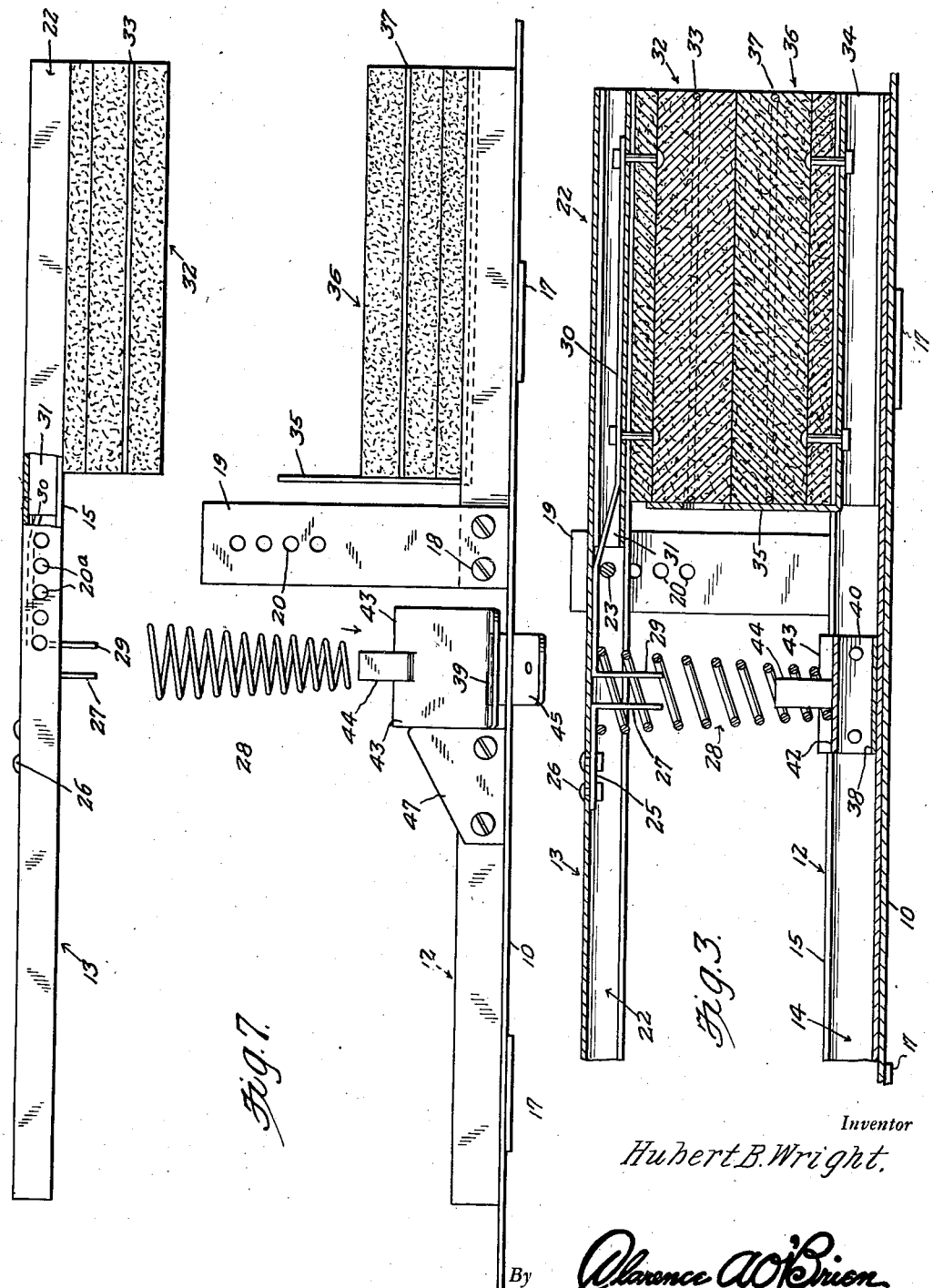

Patented June 17, 1947

2,422,512

UNITED STATES PATENT OFFICE 2,422,512

OIL GAUGE WIPER

Hubert B. Wright, Nashville, Tenn.

Application April 14, 1945, Serial No. 588,374

6 Claims. (Cl. 15—210)

This invention relates to automotive accessories and appliances, and has more particular reference to those which have come to be known as wipers for oil gauge rods and the like.

The invention has more specific reference to a wiper which is preferably and therefore best constructed for incorporation in an automobile at the time of manufacture and assembling, but which is capable of being used as an attachment, thus making it satisfactorily usable on automobiles already in use.

In carrying out the principles of the invention, I employ a simple and expedient structural assemblage of parts characterized by a pair of spaced parallel units, these having at corresponding ends felt or equivalent wiper jaws, one unit being stationary and the other pivotally mounted, the latter serving as a lever and having spring means whereby the jaw thereon is normally urged and pressed tightly against the companion jaw, and said jaws being opened and spread apart to facilitate insertion of the rod to be wiped.

Another object of the invention is to provide a simple and practicable oil gauge wiper in which the coacting parts are so made as to facilitate the manufacture thereof and subsequent systematic assembling and mounting.

Other features and advantages will become more readily apparent from the following description and the accompanying illustrative drawings.

In the drawings, wherein like numerals are employed to designate like parts throughout the views:

Figure 1 is what may be designated as a top plan view of an oil gauge rod wiper, this constructed in accordance with the principles of the present invention and showing said wiper attached to one wall of an automobile radiator.

Figure 2 is an inside elevational view showing the wiper suspended from the inner surface of the wall of the radiator shell.

Figure 3 is a horizontal section which may be said to be taken approximately on the plane of the line 3—3 of Figure 5.

Figure 4 is a transverse sectional view taken approximately on the plane of the line 4—4 of Figure 1, looking in the direction of the arrows.

Figure 5 is a similar sectional view, with parts in elevation, of the structure as it appears on the plane of the line 5—5 of Figure 1, looking in the direction of the arrows.

Figure 6 is an enlarged, in fact, an exaggerated section, on the plane of the line 6—6 of Figure 1.

Figure 7 is a top plan view based on Figure 1 showing the parts "exploded," that is, separated and in the process of being brought together in final assembled form.

Figure 8 is a perspective view of one of the parts.

Referring to the drawings by distinguishing reference numerals, it will be seen in Figures 1 and 5 that the relatively stationary supporting base, here shown as vertical in Figure 5 is denoted by the numeral 10. In actual practice, this would generally be one of the vertical side walls of the shell of the automobile hood. It is the purpose to place this wiper inside of the hood so that when the cover of the hood is up, access can be had thereto for conveniently wiping the rod before the oil measurement in the crankcase is taken. Therefore, we will assume that 10 is a stationary wall of a shield inside under hood. It is provided with an adaptation and attaching hole 11 which will be described later. The wiper structure may be visualized as embodying an outer relatively stationary unit 12 and a parallel inner companion unit 13. The unit 12 comprises an elongated adapter 14 which is channel-shaped in cross-sectional form and provided, as shown in Figure 6, with lateral inturned flanges 15. Also, as shown in Figure 6, the adapter is provided with L-shaped clips whose end portions 16 are bolted in place and whose outer end portions 17 extend through and are hooked in slots 18 in the supporting wall 10. Thus, in practice, all that is necessary is to form these slots 18 in the wall and hook the clips (parts 16 and 17) in place. Fastened, as at 18, to the intermediate portion of the adapter 14 I provide a pair of horizontal, parallel arms 19 having a plurality of selectively usable pin holes 20. These arms serve to accommodate, between their free ends, the rockable or relatively movable adapter 21. Here, again, the adapter is in the form of an elongated part which is channel-shaped in cross-sectional form and denoted by the numeral 22. It is opposed to the adapter 14, as shown in Figure 5, and therefore in alignment therewith. It will be noticed in Figure 1 that the side walls of the channel are provided with longitudinally spaced pin holes 20a, and these register with the holes 20 in the arm 19 and said holes serve to accommodate the assembling pin 23. The pin is provided with a pointed end to slip through the holes readily, and is also provided on the opposite end with a crank 24 to facilitate inserting and removing same.

I would direct attention at this time to Figure 3 showing an L-shaped clip or bracket 25 fastened at 26 in the channel and having one end projecting laterally, as at 27, into the adjacent end coils of the coiled spring 28. A similar retaining finger 29 extends into the same coiled spring, this finger being formed on the adjacent end portion of reach strip 30. This reach strip is fastened on an insertible and removable channel-shaped fitting 31. This slides into the open end of the channel-shaped adapter 22. The insert, in turn, carries a laminated felt pad or head 32, reinforced with an embracing wire band 33, this forming one of the wiper heads. Or, to put it otherwise, the wiper head is mounted on the insert 31 and the insert is slipped into the channel of the adapter, the projecting reach member 30 carrying a finger 29 laterally bent and extending down into the coil spring, as shown. There is a similar insertible fitting 34, this mounted in the adapter channel 14. This fitting has its web portion bent laterally to provide a backing finger 35 which is bent laterally and which serves as an abutment for the felt wiper 32. As a matter of fact, this part 35 facilitates assembling the two wiper heads in their respective insertible and removable fittings. Also, it abuts the head 32 and in that way prevents the head 36 from slipping out of place. The head 36 is also provided with a binding wire 37.

At this time, I direct attention to the quick, applicable, ready-to-assemble means which is employed for attaching and anchoring the wiper on the inside of hood. Reference being had, for example, to Figure 5, it will be seen that 38 denotes an L-shaped member, this having one limb extending parallel to the inner face of the usual hood and slotted, as indicated at 39. The short end of the L-shaped member, as indicated at 40, is fastened in the channel-shaped adapter. Coacting with the L-shaped member 38 is a complemental key 41. This comprises a substantially rectangular plate or body 42 (see Fig. 8) which has its inner end bifurcated with furcations indicated at 43 and the struck-out tongue indicated at 44. The key proper is reduced and on the opposite end of the plate, as indicated at 45, it is slightly offset. The bend 46 coacts with the slotted end 39 of the part or member 38 and the key 45 slips through and beyond the slot 11 and rests against the outer surface of the shell 10. The bifurcated end spans and rests upon the channel-shaped adapter, the furcation fingers 43 serving as stabilizing elements, and the laterally bent tongue 44 serving as a detent extending into the adjacent convolutions of the coiled spring, as shown. The clip 47 is on the adapter to facilitate guiding and assembling the various units and parts of the entire assembly.

Reference being had to Figure 7, it will be seen that I have attempted to here illustrate the manner of assembling the device and hanging it on the radiator shell. As before indicated, the L-shaped clips 16 and 17 on the bottom flange of the adapter unit 14 fit into the slots 18. Thus, the adapter is simply hooked in place. With the adapter thus mounted, it is necessary to assemble the coiled spring, but before placing the spring in place, it is first necessary to install the so-called key 41. This is the plate 42 seen in Figure 8. As brought out in Figure 5, the keying end 45 is slipped through the slot 11 and the prongs or furcations 43 are pressed down to straddle the open side of the channel of the adapter. This permits the tongue 10 to protrude and to provide a pilot and anchoring stud for the adjacent small end of the coil spring. Then the coil spring is slipped into place. Next, the adapter 21 is forced against the spring and between the arms 19. In other words, as the adapter 21 is placed between the free ends of said arms, the studs or fingers 27 and 29 (see Fig. 3) are slipped into the spring and the spring is then compressed and while the spring is held compressed with the adapter between the arms 19, the locking pin 23 is passed through the desired apertures 20 and 20a and consequently the spring exerts tension in opposite directions and helps to keep all of the parts assembled in a reliable and expeditious manner.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. An oil gauge wiper of the class described comprising an elongated relatively stationary unit provided at one end with a wiper element, a companion correspondingly elongated unit opposed to the first-named unit, a wiper element on the outer end thereof coacting with the first-named wiper element, said first-named unit being provided with a pair of fixedly mounted parallel arms, said arms being provided with selectively usable hinge pin holes, the intermediate portions of the second-named unit being provided with coacting hinge pin selectively usable holes, and a removable hinge pin passing through selected holes in the arms and said second-named unit to pivotally and detachably mount the said unit between said arms and spring means interposed between and connected with said units.

2. An oil gauge wiper of the class described comprising an elongated relatively stationary unit provided at one end with a wiper element, a companion correspondingly elongated unit opposed to the first-named unit, a wiper on the outer end thereof coacting with the first-named wiper element, said first-named unit being provided with a pair of fixedly mounted parallel arms, said arms being provided with selectively usable hinge pin holes, the intermediate portions of the second-named unit being provided with coacting hinge pin selectively usable holes, and a removable hinge pin passing through selected holes in the arms and said second-named unit to pivotally and detachably mount the said unit between said arms, the intermediate portions of said units being provided with laterally extending spring assembling and retaining elements, and a coiled thrust spring interposed between said units and having its end convolutions surrounding said elements.

3. In an oil gauge wiper of the class described, a pair of opposed normally spaced and parallel companion units, said units being channel-shaped in cross sectional form, wiper blocks, said blocks having inserts and said inserts being properly shaped and fitted telescopically into corresponding channeled ends of said units, one of said units being provided with spaced parallel arms, the other unit being mounted between said arms, a hinge pin securing the last-named unit between the arms and comprising a pivot for said units, clips on the last-named unit provided with prongs, a bracket arm associated with the first-named unit and provided with a prong associated with the first-named prongs, and a coiled spring having one end between the side walls of the second-named unit and surrounding the coacting prongs, the opposite end of said coiled spring surrounding the prong on the first-named unit.

4. In a structure of the class described, in combination, a relatively fixed apertured wall, a channel-shaped adapter having clips, said clips being hooked in apertures in said wall to hold the adapter in place, an L-shaped arm carried by said adapter and paralleling said wall, said L-shaped element being slotted at its free end, a keying plate having a laterally directed key coacting with the slot in said L-shaped element, said wall having an aperture through which the key is removably inserted and held in place, said key having a bifurcated end and a lateral prong coacting with the furcations, the bifurcated end spanning the open side of the channel-shaped adapter.

5. In a structure of the class described, in combination, a relatively fixed apertured wall, a channel-shaped adapter having clips, said clips being hooked in apertures in said wall to hold the adapter in place, an L-shaped arm carried by said adapter and paralleling said wall, said L-shaped element being slotted at its free end, a keying plate having a laterally directed key coacting with the slot in said L-shaped element, said wall having an aperture through which the key is removably inserted and held in place, said key having a bifurcated end and a lateral prong coacting with the furcations, the bifurcated end spanning the open side of the channel-shaped adapter, a pair of plates secured to intermediate portions of said channel-shaped adapter, a second channel-shaped adapter adjustably and pivotally mounted between the free ends of said arms, and a coiled spring interposed between said adapters and engaging said prong at one end, the second-named adapter being provided with prongs fitting into the adjacent end of said spring.

6. As a new article of manufacture and as a component part of an assemblage of the class described, an elongated adapter of channel-shaped cross-sectional form, a channel-like insert insertible and removable in said adapter, a felt block carried by said insert and constituting a wiper element, an L-shaped prong carried by said adapter, a reach arm connected to said insert and provided with a laterally directed finger opposed to said L-shaped prong.

HUBERT B. WRIGHT.

REFERENCES CITED

The following references are of record in the file of this patent:

UNITED STATES PATENTS

| Number | Name | Date |
|---|---|---|
| 2,222,191 | Zisman | Nov. 19, 1940 |
| 2,222,303 | Shough | Nov. 19, 1940 |
| 2,244,579 | Scott | June 3, 1941 |
| 1,767,954 | Adam | June 24, 1930 |